(12) United States Patent
Erickson et al.

(10) Patent No.: US 7,159,617 B2
(45) Date of Patent: Jan. 9, 2007

(54) BALANCED GLOBE VALVE

(75) Inventors: Irving C. Erickson, Rockford, IL (US); Hongming Ge, Rolling Meadows, IL (US); Bonnie Dickinson, Durand, IL (US)

(73) Assignee: Invensys Building Systems, Inc., Loves Park, IL (US)

(*) Notice: Subject to any disclaimer, the term of this patent is extended or adjusted under 35 U.S.C. 154(b) by 0 days.

(21) Appl. No.: 11/250,956

(22) Filed: Oct. 14, 2005

(65) Prior Publication Data

US 2006/0048827 A1   Mar. 9, 2006

Related U.S. Application Data

(63) Continuation of application No. 10/702,420, filed on Nov. 6, 2003, now Pat. No. 7,017,608.

(51) Int. Cl.
*F16K 11/07* (2006.01)

(52) U.S. Cl. .................. 137/625.38; 251/118; 251/282; 251/325

(58) Field of Classification Search ........... 137/625.33, 137/625.35, 625.37, 625.38, 625.39; 251/118, 251/282, 325
See application file for complete search history.

(56) References Cited

U.S. PATENT DOCUMENTS

| 4,054,155 A | * | 10/1977 | Hill ........................ 137/625.48 |
| 4,276,906 A | | 7/1981 | Eguchi |
| 4,429,716 A | | 2/1984 | Conrad |
| 6,394,135 B1 | | 5/2002 | Erickson et al. |

\* cited by examiner

*Primary Examiner*—John Fox
(74) *Attorney, Agent, or Firm*—Reinhart Boerner Van Deuren P.C.

(57) ABSTRACT

An essentially fully balanced plug valve is presented in which the flow control contour is interior to the moving member. The sealing edge of the moving member is at the exterior surface relative to the interior contour. This sealing edge is formed by use of matching angles on the interior of the moving member and the exterior of the stationary member. As a result, operation of the plug is fully balanced with the internal fluid pressure of the liquid therein. The sealing surface of the stationary member is positively retained therein to prevent blowout of the sealing surface. Should failure of the sealing surface occur, a secondary metal-to-metal seal will provide fluid containment albeit possibly at a reduced containment level.

4 Claims, 13 Drawing Sheets

FIG. 16

BALANCED GLOBE VALVE

CROSS-REFERENCE TO RELATED PATENT APPLICATIONS

This patent application is a continuation of co-pending U.S. patent application Ser. No. 10/702,420, filed Nov. 6, 2003 now U.S. Pat. No. 7,017,608, pending, the teachings and disclosure of which are hereby incorporated in their entireties by reference thereto.

FIELD OF THE INVENTION

The present invention relates generally to balanced plug valves, and more particularly to fully balanced plug valves having an internal seat contour governing flow rate modulation therethrough.

BACKGROUND OF THE INVENTION

Control systems and manual applications utilize various types of valves to turn fluid flows on and off, and also to modulate the rate of fluid flow through the valve. Fluid flow through a valve results from pressure differentials between upstream sources and downstream destinations. Fluid flow is a function of pressure differentials and conduit resistance. Control is generally achieved by varying the resistance to flow by varying the available flow area between zero and a maximum. A valve is the conventional method of varying area.

Sliding gate valves present one method of varying flow area. However, in such a valve, the differential pressure from the upstream side to the downstream side multiplied by the area of the obstruction separating each side results in a substantial number. This number represents a load on the guides supporting the gate. This load increases friction in a manner proportional to the area and pressure drop. With increased friction, the amount of force required to move the gate increases, thus requiring more powerful actuators. With greater actuator force requirements, costs escalate. Further, control system dead band becomes larger, which negatively affects system stability.

Plug type valves are an additional method of varying flow area. These valves reduce the flow area by forcing a plug into a hole. When the plug is lowered from the upstream side, typically the result is that the plug slams shut against a valve seat due to upstream pressure and inertia forces pushing the plug toward the hole. This slamming causes hammering which creates noise and valve damage. Forcing a plug into a hole from the downstream side can also reduce the flow area. In such a scenario, the obstruction pushes against a substantial opposing force, the force being proportional to hole size and pressure drop between the upstream and downstream sides. With increased opposing forces, the amount of force required to move the plug increases, thus requiring more powerful actuators. Again, with greater actuator force requirements, costs escalate.

In both the gate valve and plug valve instances, the difference in upstream and downstream pressures is the root of their shortcomings. To overcome these shortcomings, balancing of fluid forces is required.

One known arrangement utilizes two circular seats where the pressure forces cancel. These valves are relatively larger and more expensive than the standard gate and plug valves. Further, it is often difficult to ensure proper mechanical closure of both seats.

A second known arrangement utilizes one circular seat with a balancing chamber connected to the upstream pressure with a movable piston tied to a valve stem. These valves are complex, and again more expensive to manufacture.

As an alternative to the aforementioned larger and more costly balanced valves, it is known to create a balanced valve where the flow passes through a balanced plug that is typically in the shape of a cylinder. The cylindrical or other closed perimeter shaped plug that allows fluid to pass through is known as a balanced plug and is a key element in forming a balanced plug valve. The cylinder method successfully eliminates the friction and back pressure forces, thus forming a balanced valve. However, the known cylinder type balanced valves have their own shortcomings. These include the fact that they have poor capability for flow modulation or for tight shut-offs.

In view of the foregoing limitations and shortcomings of the above noted devices, as well as other disadvantages not specifically mentioned, a balanced plug valve with the ability to predictably modulate flow and also provide for tight shut-off of flow was developed by the assignee of the instant invention. This a balanced plug valve with a contour shaped wall is described and illustrated in U.S. Pat. No. 6,394,135, issued on May 28, 2002, the teachings and disclosure of which are incorporated herein in their entireties by reference thereto. The contour shaped wall of this balanced plug valve forms a gap with an edge of a balanced plug. Fluid is able to flow through an input port, through the balanced plug, through the gap, and out an output port. The shape of the contour and the relative position of the balanced plug to the contour shaped wall affect the modulation of the rate of the fluid flow through the gap, and thus, through the valve. Multiple possible variations of the dimensions of the contour shaped wall make possible a multitude of flow rate verses valve stroke relationships. Further, the use of a balanced valve decreases friction forces on the plug which allows for smaller, more efficient, and more economical valve actuators.

While this balanced plug valve presents significant advantages to the art and provides fully balanced operation on a two-way valve with an external contour, operation with an internal contour, such as shown in FIG. 6 of the Erickson et al. '135 patent, is not quite balanced. That is, when the valve is closed, fluid pressure acts on one end of the plug, while the internal edge of the plug that sealing engages the contoured edge is isolated from this fluid pressure. As a result, there is a pressure differential across the plug, resulting in unbalanced forces.

Therefore, there exists a need in the art for a fully balanced plug valve that includes an internal seat flow control contour that governs the flow modulation through the valve, and that provides for tight shut-off of flow.

BRIEF SUMMARY OF THE INVENTION

In view of the above, the present invention provides a new and improved balanced plug valve. More particularly, the present invention provides a new and improved balanced plug valve. More particularly, the present invention provides a new and improved balanced plug valve having an internal contour, the shape of which controls the modulated flow rate through the improved plug valve. Still more particularly, the present invention is directed to an improved balanced plug valve having a reduced cost and enhanced performance over previous valves by including a new plug/seat configuration.

The internal contour of the present invention provides a far more streamlined flow path allowing higher flow ratings and reduced manufacturing cost. Further, increased control and predictability of flow rates may be achieved through the present invention.

In another aspect of the present invention, the balanced plug valve of the present invention provides a metal displacement method of seat ring retention eliminates or substantially reduces the possibility of seat blow out. This is accomplished in one embodiment of the present invention with positive containment method that also may have applicability to unbalanced valves.

In a further aspect of the present invention, flow through the contoured flow restriction paths are available at velocity levels that could incite plug vibration due to varying combinations of a number of flow forces in prior designs. This aspect is achieved in accordance with an aspect of the present invention by narrowing the flow path for better guiding, and adding alternate flow paths. Such alternative flow paths include, in one embodiment of the present invention, the addition of radial flow through one or more holes or gaps in the flow throttling area of the internal contour.

In addition to fully balanced operation, the sealing end configuration of the balanced plug provides for ANSI 4 or bubble tight sealing during normal operation. Further, this configuration provides an ANSI 3 metal-to-metal seal in the event of O-ring failure of the valve seat. This end configuration also provides a metal stop to prevent O-ring over compression during normal operation, thereby enhancing seal life.

While it is common to use continuous sliding seals for pistons having the continuous seals installed in grooves, the rigidity of the elastic cross-section prevents effective use of outside diameter contact due to the high friction from the compression of the cross-section. In such arrangements, radial stretch is required to control the sliding friction. However, the stretch factor varies greatly with temperature, especially with non-elastomers such as PTFE (Teflon®). In accordance with an aspect of the present invention, PTFE tubing is cut to the proper length and installed with the ends butted together against each other in the groove. The squeeze of the tubing is used for proper sealing and sliding forces. This allows ease of installation, and removes the requirement of specific sealed diameters for specific sized valves. Further, sensitivity to temperature variation is significantly reduced.

Other features and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
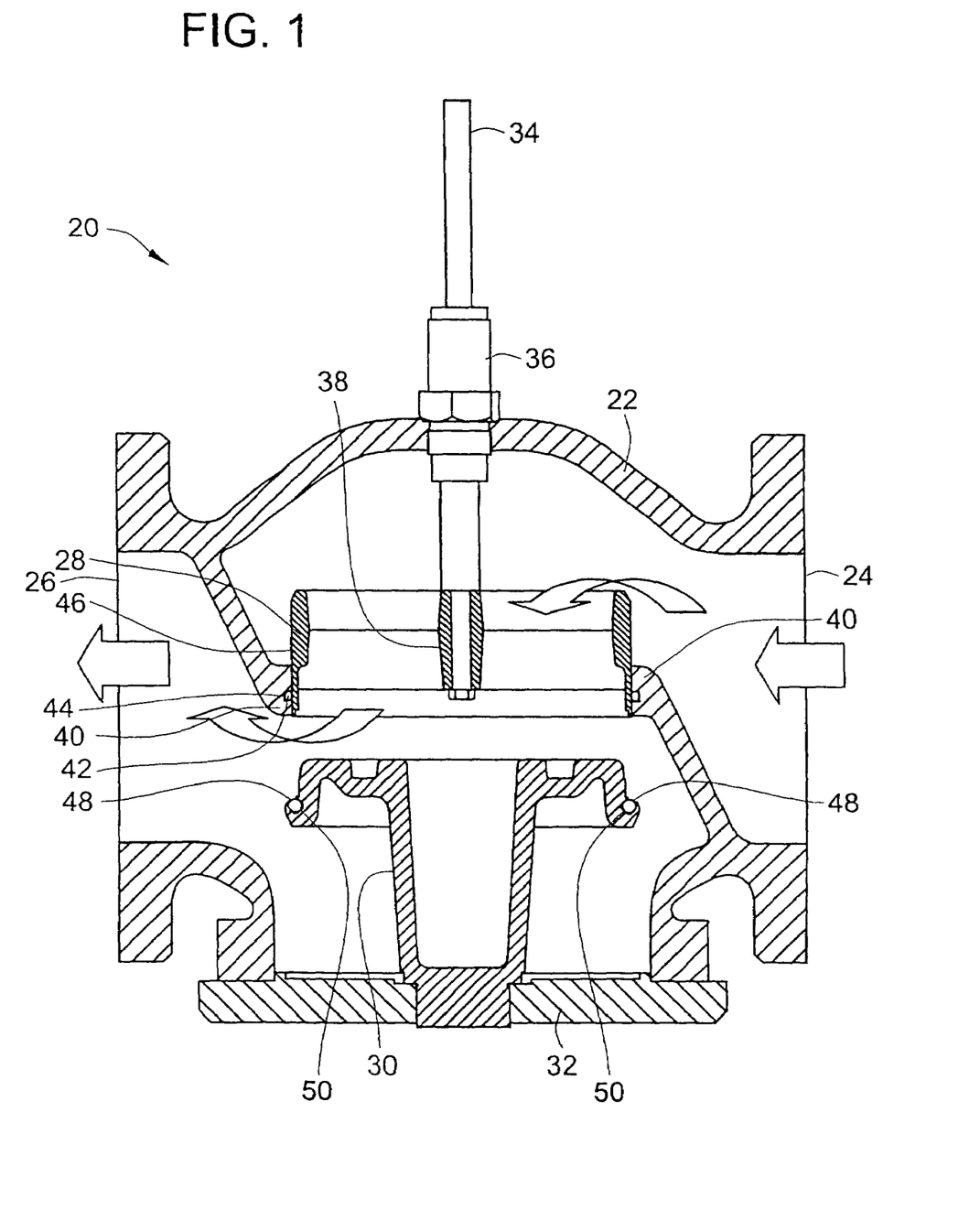
FIG. 1 is a cross sectional illustration of a normally open fully balanced globe valve constructed in accordance with the teachings of the present invention, shown in its open position.

Turning now to the drawings, there is illustrated in FIG. 1 a partial cross-sectional view of a normally open fully balanced globe valve 20 constructed in accordance with the teachings of the present invention. This valve 20 includes a valve body 22 having an inlet coupling 24 and an outlet coupling 26. Regulation of the flow of fluid from the inlet 24 to the outlet 26 is accomplished through the cooperation of the balanced plug 28 and the contoured seat 30 as will be described more fully below. In this embodiment of the present invention, the contoured seat 30 is held in position within the valve body 22 by bonnet 32 that is fixably attached to the valve body 22. The relative positioning of the balanced plug 28 in relation to the contoured seat 30 is accomplished by moving valve stem 34 linearly into or out of the valve body 22 slidably through packing 36. While not illustrated in this FIG. 1, the linear movement of valve stem 34 is typically accomplished through the provision of an actuator.

Figure 2:
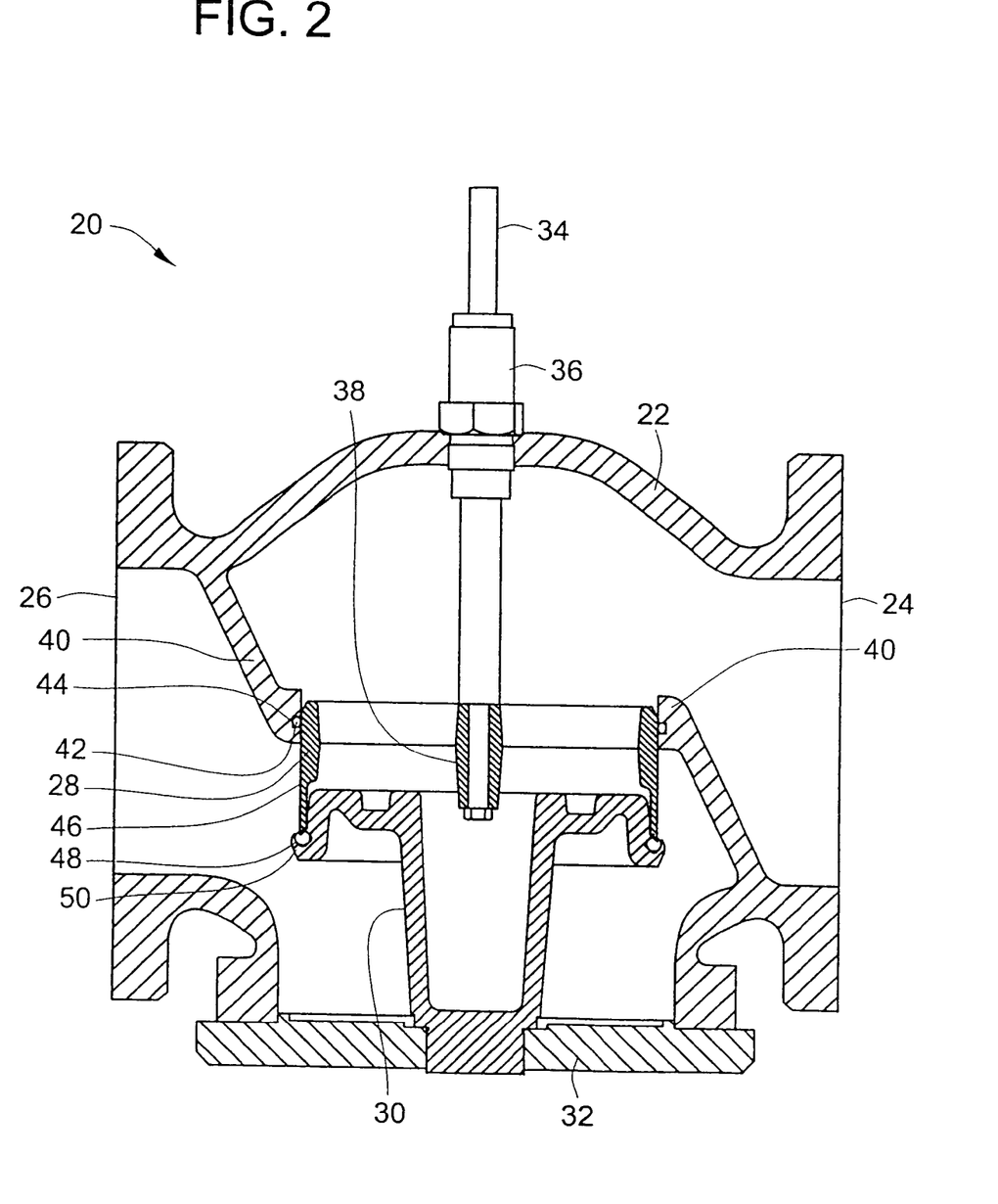
FIG. 2 is a cross sectional illustration of a normally open fully balanced globe valve constructed in accordance with the teachings of the present invention, shown in its closed position.

The balanced plug 28 is generally cylindrical in shape, but can be of other closed perimeter shapes as well. Valve stem 34 is mounted to the plug 28 at a center hub 38. This balanced plug 28 is prevented from moving in directions other than generally along the vertical axis of FIG. 1 by a guide 40 extending from the valve body 22. The guide 40 may be integral with the valve body 22. A sliding seal O-ring 42 is positioned within a groove 44 of guide 40, sealing the balanced plug 28 at a perimeter wall 46 to block fluid passage between the exterior of the perimeter wall 46 of the balanced plug 28 and the guide 40. A close off O-ring seal 48 is positioned within a groove 50 of the contoured seat 30 to block fluid passage between the exterior of the perimeter wall 46 of the balanced plug 28 and the contoured seat 30 when the balanced plug 24 is in a closed position as illustrated in FIG. 2.

Figure 3:
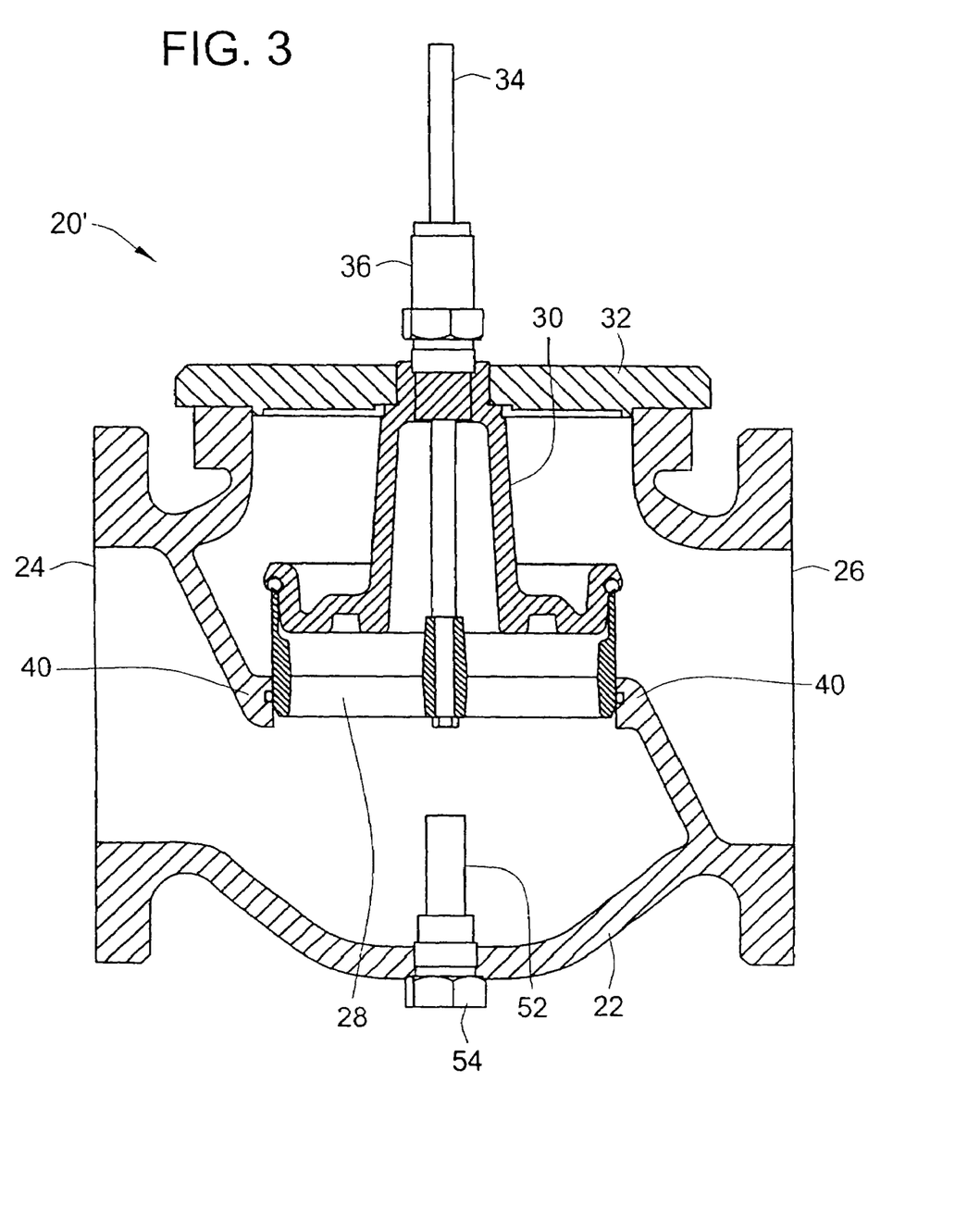
FIG. 3 is a cross sectional illustration of a normally closed fully balanced globe valve constructed in accordance with the teachings of the present invention, shown in its closed position.
Figure 4:
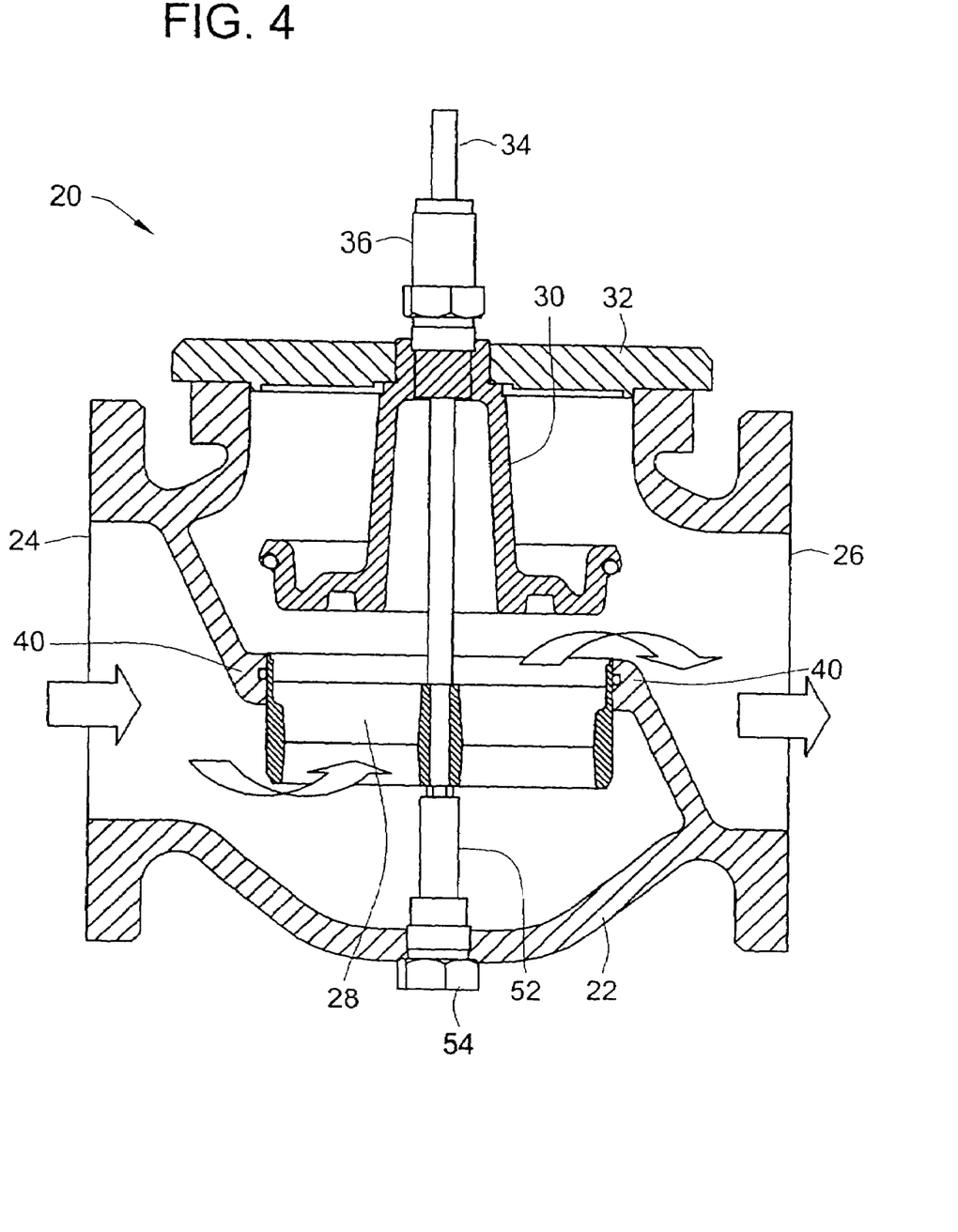
FIG. 4 is a cross sectional illustration of a normally closed fully balanced globe valve constructed in accordance with the teachings of the present invention, shown in its open position.

An alternate embodiment of a normally closed fully balanced globe valve 20' is illustrated in its normally closed position in partial cutaway illustration of FIG. 3. As may be seen from an examination of this figure, the valve stem 34 now linearly slides through packing 36 which is secured within bonnet 32. This valve stem 34 also traverses the contoured seat 30 before coupling to the balanced plug 28. In this normally closed embodiment 20', a valve stem travel stop 52 is removably positioned through valve body 22 by nut 54. As may be seen from the partial cross-sectional illustration of FIG. 4, this valve stem travel stop 52 is utilized to prevent over travel of valve stem 34 which could result in disengagement of the fully balanced plug 28 with the guides 40.

Figure 5:
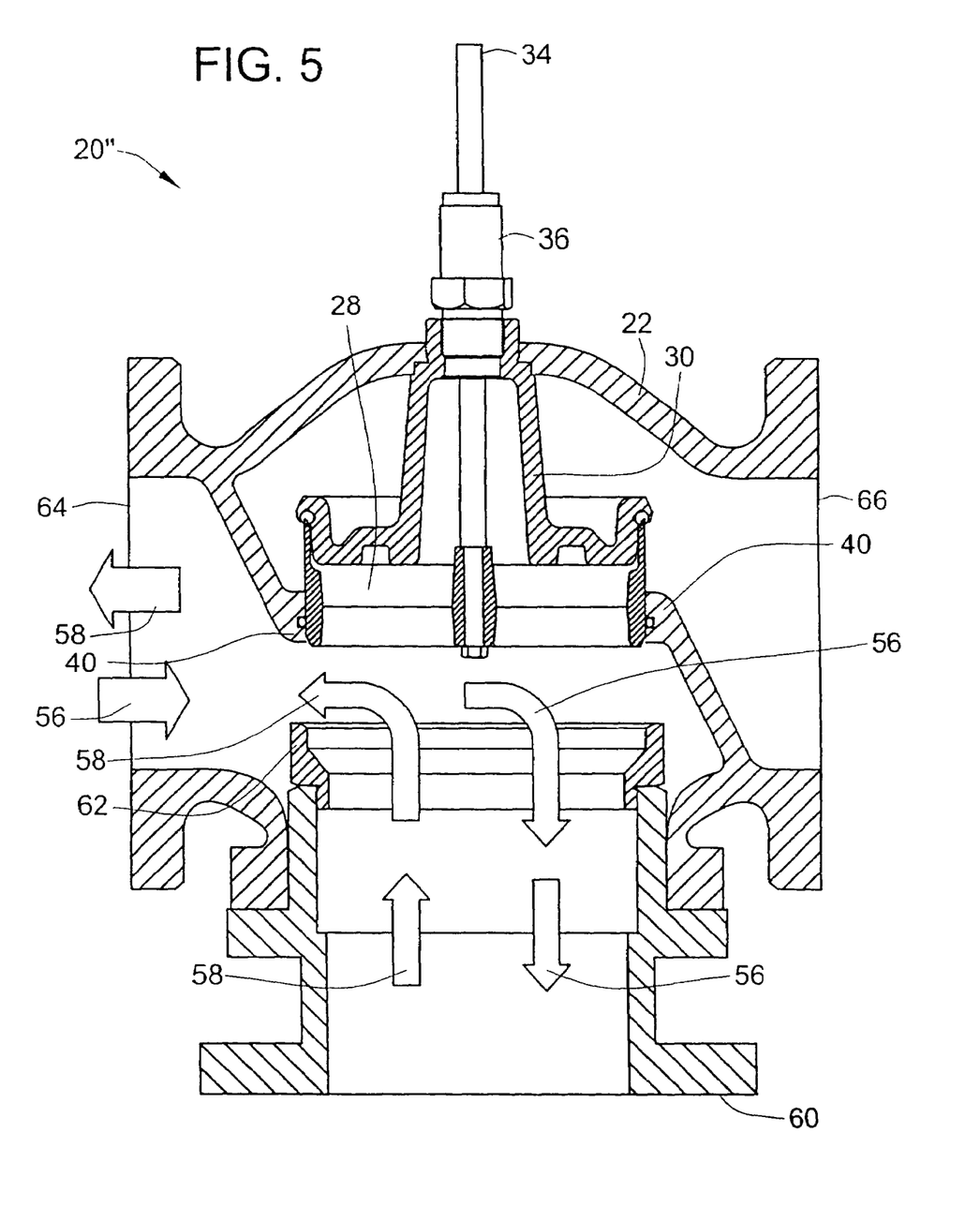
FIG. 5 is a cross sectional illustration of a fully balanced three-way globe valve constructed in accordance with the teachings of the present invention, shown in its up position.

A further alternate embodiment of a fully balanced globe valve constructed in accordance with the teachings of the present invention is illustrated in partial cross-sectional view in FIG. 5. Specifically, this embodiment is a three-way fully balanced globe valve 20" shown in an up location in FIG. 5 and in a down location in FIG. 6. It should be noted that such a three-way valve is often used as a mixing valve when the flow is in the direction of flow arrows 56, and as a diverting valve when the flow is in the direction of arrows 58.

Figure 6:
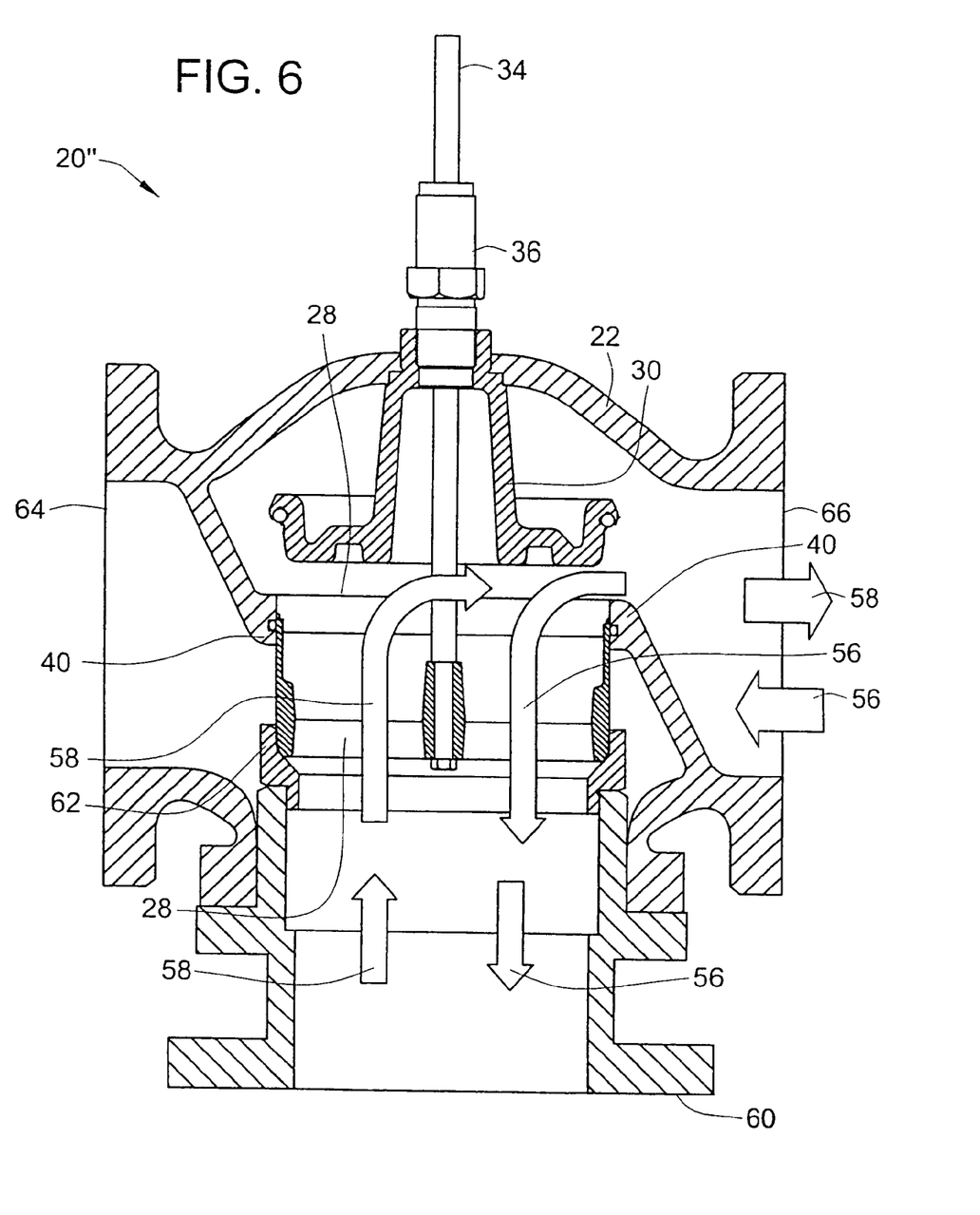
FIG. 6 is a cross sectional illustration of a fully balanced three-way globe valve constructed in accordance with the teachings of the present invention, shown in its down position.

As may be seen from these FIGS. 5 and 6, the three-way fully balanced globe valve of the present invention includes a diverter/mixing coupling 60 coupled to the valve body 22. A valve seat 62 is attached at the interior end of the coupling 60 to provide sealing engagement with the balanced plug 28 in its down location as illustrated in FIG. 6. In the up location (FIG. 5) the sealing engagement is provided between the contoured seat 30 and the opposite sealing edge of the balanced plug 28. It should be noted that in addition to these two exclusive positions of FIGS. 5 and 6, some applications may adjustably position the balanced plug 28 between these two extreme locations to control the relative flows into or out of couplings 64, 66. As will be discussed more fully below, the shape of the contours of the contoured seat 30 and the seat 62 may also aid in controlling the relative flow through the valve.

Figure 7:
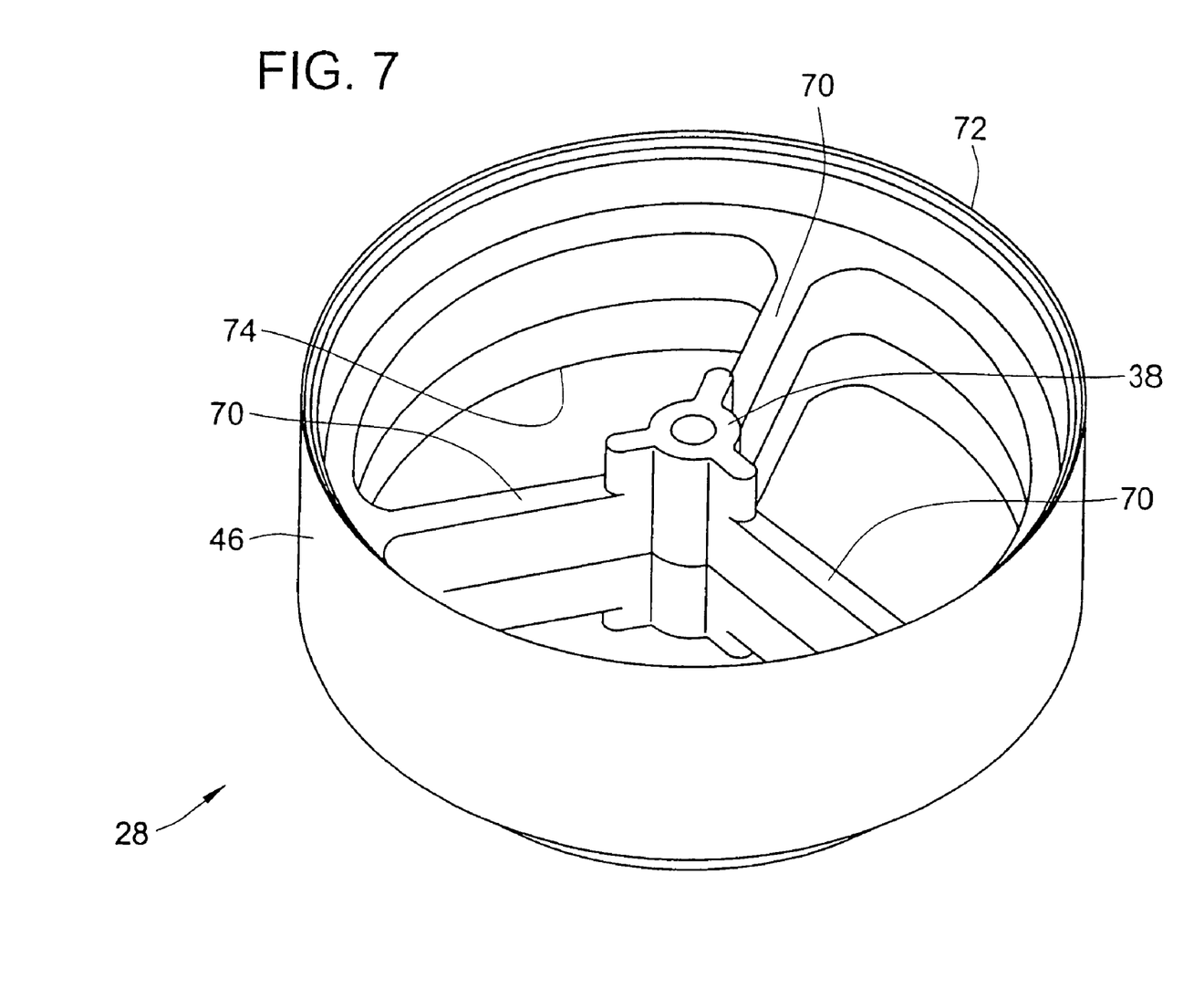
FIG. 7 is an isometric illustration of an embodiment of a balanced plug constructed in accordance with the teachings of the present invention.

Having now described various embodiments of a fully balanced valve constructed in accordance with the teachings of the present invention, attention is now directed to FIG. 7 wherein an embodiment of a balanced plug for use in such valves is illustrated. As may be seen from this isometric illustration, the balanced plug 28 includes the central hub 38 which is adapted to receive the valve stem therethrough. Supporting the center hub 38 are multiple spokes 70 extending to the perimeter wall 46 of the plug 28. The edges 72, 74 of the balanced plug 28 are specifically profiled to ensure fully balanced operation of the valve as will be discussed more fully below.

Figure 8:
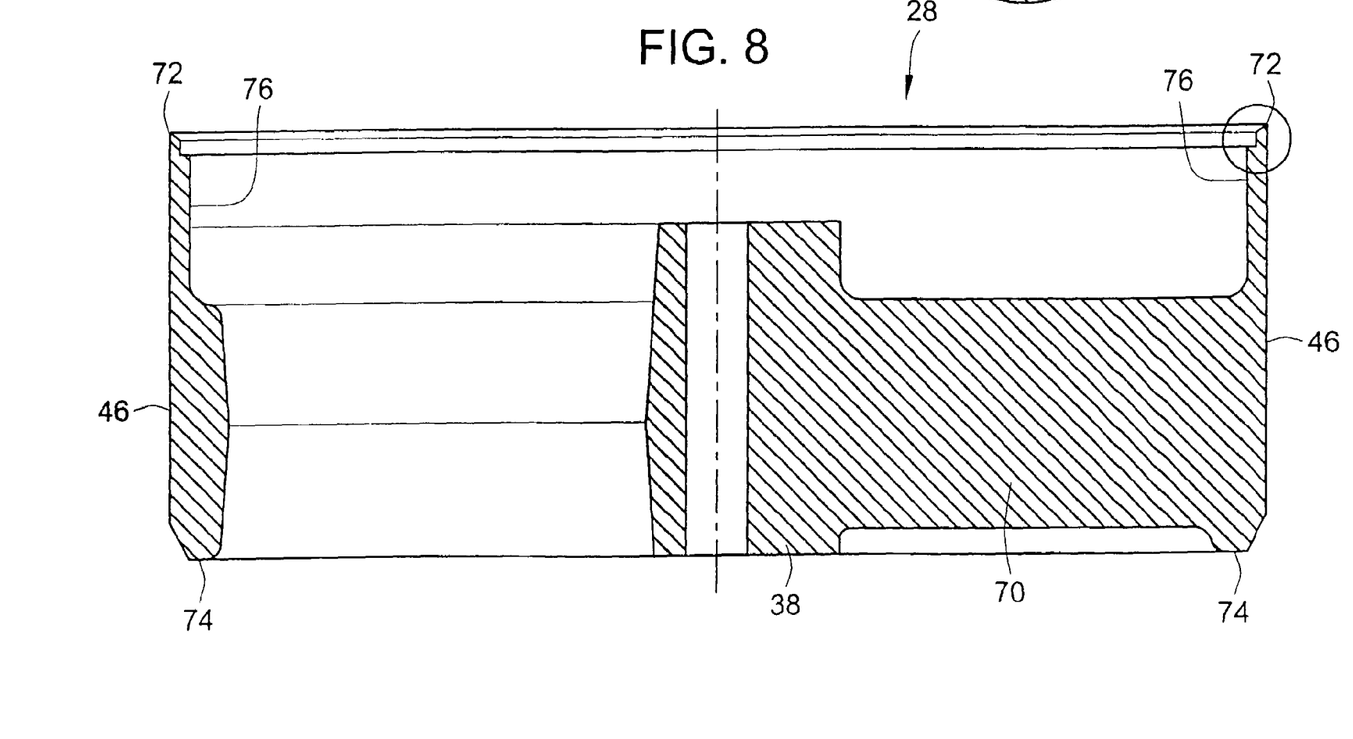
FIG. 8 is a partial sectional view of the balanced plug of FIG. 7.

As may be seen from the cross-sectional illustration of FIG. 8, the support spokes 70 are preferably shorter than the perimeter wall 46 of the balanced plug. In this way, a portion 76 of perimeter wall 46 may accommodate the contoured seat without interference from the supporting spokes 70. Also preferably, the width of the spokes 70 is also such to allow edge 74 of the balanced plug 28 to extend beyond the spokes 70.

Figure 9:
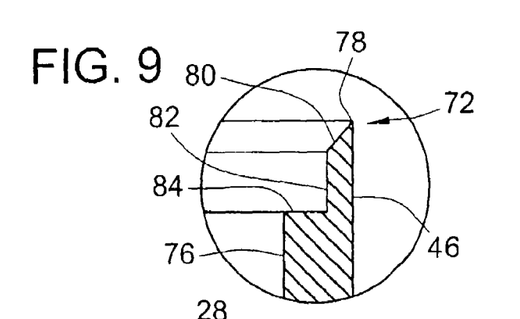
FIG. 9 is an exploded detail view of a sealing edge of the balanced plug of FIG. 7.

The details of sealing edge 72 may be better observed with reference to the expanded partial sectional view of FIG. 9. Specifically, this sealing edge 72 defines a seal contact point 78 that is adapted to form a sealing contact with the sealing O-ring 48 (FIG. 1). A pressure equalizing contact wall 80 is defined next to the sealing contact point 78 to ensure pressure equalization across the perimeter wall 46 when the valve is in a sealing engagement with the contoured seat of the fully-balanced globe valve as will be discussed more fully below. This pressure equalizing wall 80 is unique to the balanced plug of the present invention and enables the fully balanced operation described herein. This end 72 also includes a sealing step 82 that terminates in shoulder 84. This shoulder 84 also serves to allow pressure equalization across the perimeter wall 46 of the balanced plug 28, and provides the backup function of a secondary seal in the event failure of the primary sealing O-ring, as will be discussed more fully below.

Figure 10:
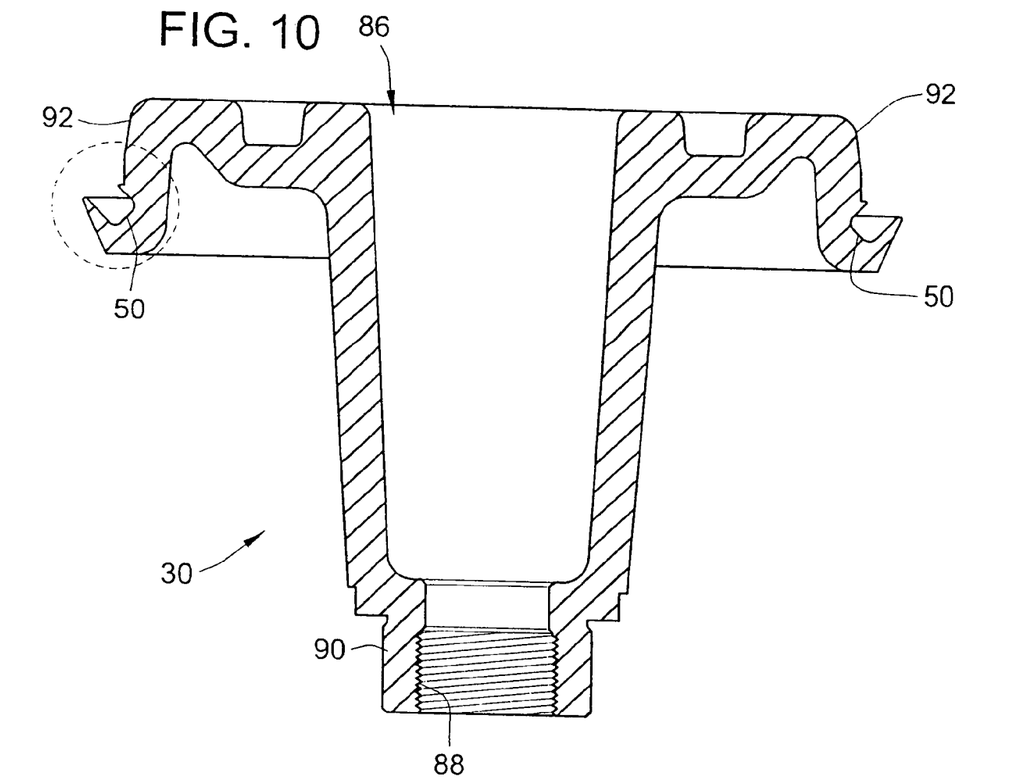
FIG. 10 is a sectional view of an embodiment of a contoured seat for use in a fully balanced globe valve constructed in accordance with the teachings of the present invention.

An embodiment of the contoured seat 30 is illustrated in cross-sectional view in FIG. 10. As may be seen from this cross-sectional illustration, the contoured seat is generally cylindrical in shape to mate with the balanced plug 28 discussed above. To allow this contoured seat to be used in various types of valve configurations such as those discussed above with regard to FIGS. 1–6, the contoured seat 30 preferably defines an internal cavity 86 through the center thereof. This central cavity 86 communicates with the threaded mounting hole 88 in the bonnet mounting portion 90 of the seat 30. As may be recalled from the discussion of FIGS. 1 and 3 above, this mounting hole 88 of bonnet mounting portion 90 may be used to either simply secure the seat 30 to the bonnet 32 for normally open type valves, or may receive the packing 36 to accommodate the slidable translation of valve stem 34 therethrough in the case of normally closed valve embodiments.

Figure 11:
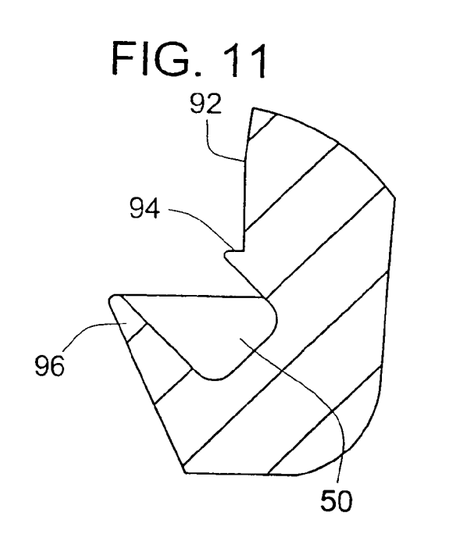
FIG. 11 is a expanded detail sectional view of a seal retaining portion of the contour seat of FIG. 10.
Figure 12:
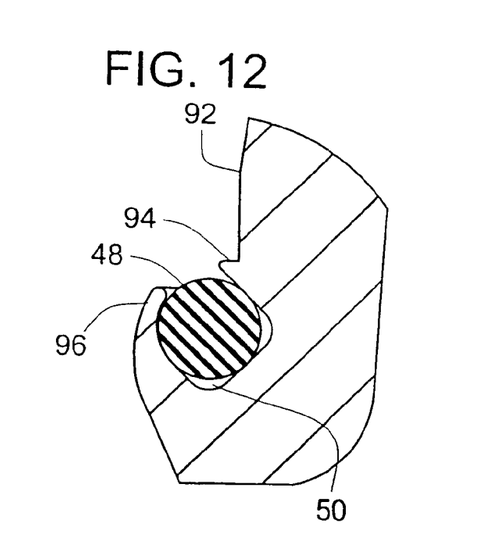
FIG. 12 is an expanded detail sectional view of the seal retainer portion of the contour seat of FIG. 10 shown with a seal member retained therein.

The contoured seat 30 may include a flow regulating contoured wall portion 92 having a profile that acts in relation to the balanced plug to regulate the flow of fluid therethrough. As may be better seen in the expanded partial sectional view of FIG. 11, the contoured surface 92 preferably terminates in a secondary sealing surface 94. The O-ring groove 50 is formed therebelow such that this secondary sealing surface 94 also serves the dual purpose of retaining the O-ring seal therein. This retention of the O-ring is further facilitated by the provisions of the wrap wall portion 96. Specifically, and with reference to FIG. 12, once the O-ring 48 has been placed within the groove 50 of the contoured seat 30, the wrap wall portion 96 is rolled to wrap around the O-ring 48. In this way, the O-ring seal 48 is inhibited from being blown out by the fluid pressure through the valve as could often occur with other valves which are dependent upon O-ring tension for retention.

Figure 13:
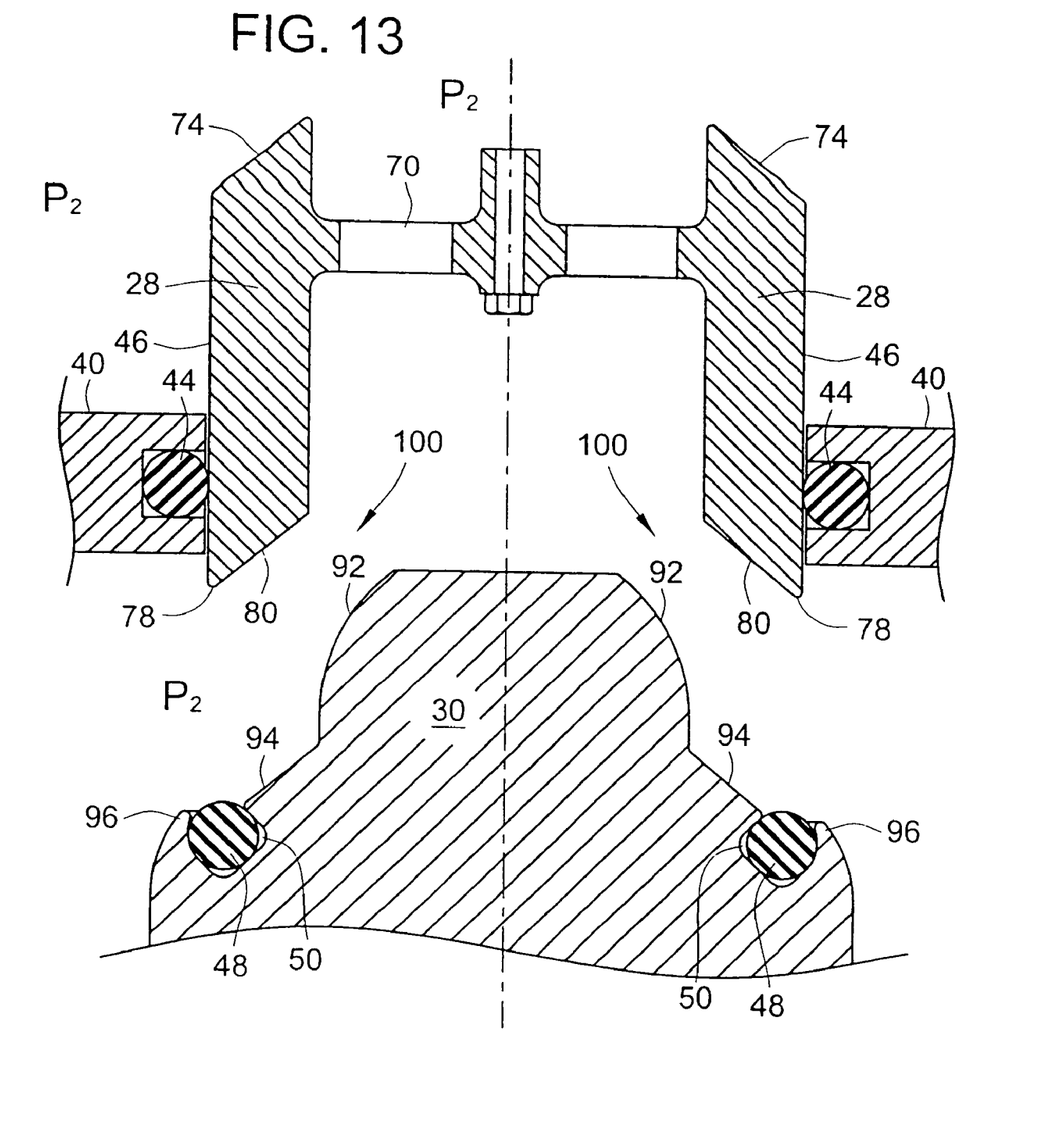
FIG. 13 is a cross-sectional view of an embodiment of a two-way fully balanced globe valve shown in its open position.
Figure 14:
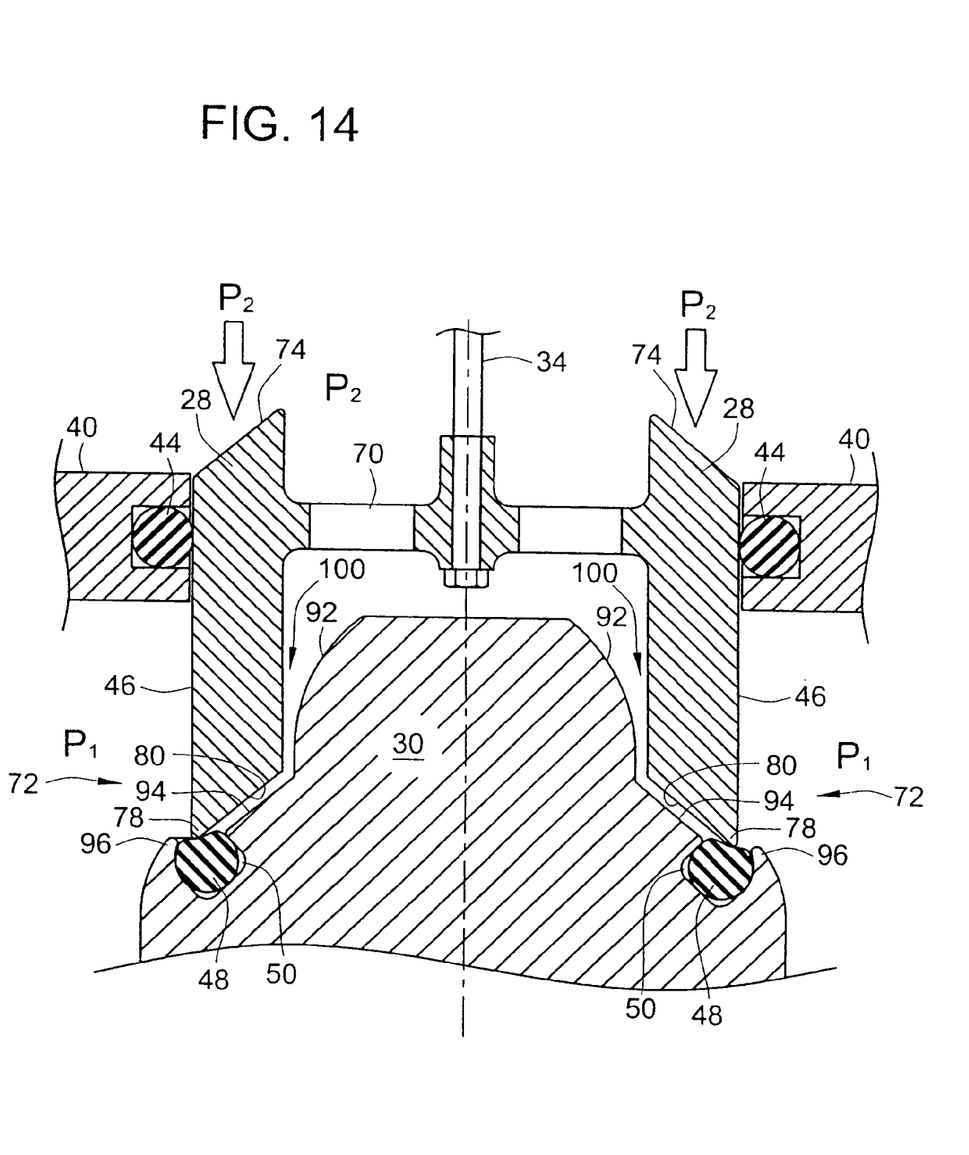
FIG. 14 is a cross-sectional view of an embodiment of a two-way fully balanced globe valve shown in its closed position.

Having now described various embodiments of fully balanced globe valves and an embodiment of the balanced plug and contoured seat of the present invention, attention is now directed to FIGS. 13 and 14 wherein the balanced operation of a valve of the present invention will be described in relation to a further alternate embodiment.

When the valve of the present invention is operated in a manner to allow fluid flow therethrough, the balanced plug 28 is positioned relative to the contoured seat 30 such that a flow gap 100 is formed between the contoured wall 92 of seat 30 and wall 80 of the plug 28. The flow of fluid through this flow gap 100 may be adjusted by vertically adjusting the relative position of the plug 28 to the seat 30. Various flow profiles may be defined for such vertical positioning by changing the contour 92 of the seat 30 to provide the desired flow characteristics. While operating in this mode, the plug 28 is essentially fully balanced. That is, the fluid pressure $P_2$ of the source fluid acting on surface 74 of the plug 28 tending to push the plug 28 in a downward direction of FIG. 13 is balanced by the fluid pressure $P_2$ acting on surface 80, which tends to push the plug 28 in an upward direction of FIG. 13. Because these pressure forces are balanced across the plug 28, no additional force to counteract a fluid pressure imbalance is required from the actuator to reposition the stem 34 as desired. This greatly enhances the ability to precisely control the fluid flow through the valve, and presents a significant advantage over unbalanced valves described above.

When the flow of fluid through the valve is desired to be stopped, the plug 28 is positioned such that sealing point 78 comes in sealing engagement with O-ring seal 48. In this way, no fluid is able to flow through flow gap 100 to the valve outlet. However, it is important to note that surface 180 is still exposed to the fluid pressure $P_2$ of the fluid source while the valve is in this closed position. In this way, the plug 28 is still balanced, and will not require any additional power from the actuator to overcome a fluid imbalance that exists with prior valves. That is, because the fluid pressure $P_2$ is still able to act on surface 80 of plug 28, this fluid pressure balances the fluid pressure that continuously acts on surface 74. Without such a gap, the fluid pressure $P_2$ acting on surface 74 would tend to hold the valve in its closed position, and would require additional force to be applied from the actuator to overcome the fluid pressure differential across the plug 28. In prior valves, this often resulted in an overshoot once the valve was opened and the fluid pressure was again balanced across the plug. Such an overshoot made precise flow control difficult. However, such pressure imbalance while in the closed position is eliminated with the design of the present invention.

An additional advantage is provided by the design of the sealing end 72 of the balanced plug 28 of the present invention. Specifically, if the sealing O-ring 48 were to be lost from groove 50, surface 80 of the plug 28 would be forced into contact with surface 94 of the contoured seat 30 to provide a backup seal in the event of this type of failure. While the original seal between point 78 and O-ring 48 is of an ANSI IV or bubble tight nature, the contact of surfaces of 80 and 94 will still provide a type ANSI III seal.

Figure 15:
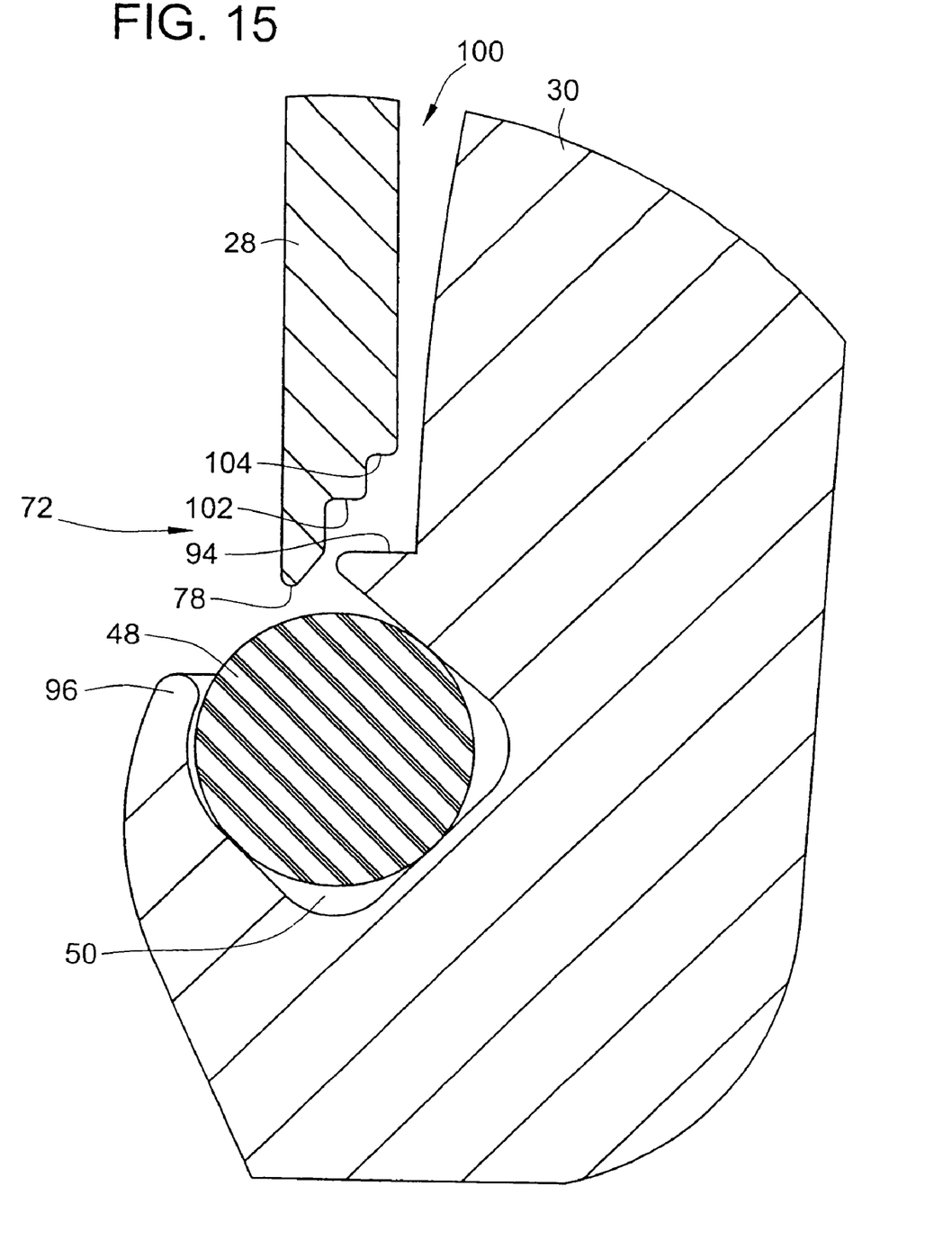
FIG. 15 is a partial cross-sectional view of an alternate embodiment of a sealing arrangement for the fully balanced globe valve of the present invention.

As may be seen from the alternate embodiment of the sealing end 72 of the balanced plug 28 illustrated in FIG. 15, the actual configuration of this operative end of the balanced plug may differ significantly in its various embodiments. In the embodiment of FIG. 15, the sealing end portion 72 includes the sealing contact point 78 in the form of a finger protrusion that contacts the O-ring seal 48. A shoulder land 102 and a pressure equalization surface 104 are provided to allow the pressure balancing across the plug 28 as discussed above. Additionally, the configuration of the embodiment of FIG. 15 also provides additional functionality. That is, in one embodiment the shoulder land 102 is provided at a relative location such that the shoulder land 102 may contact surface 94 of the contoured seat 30 to prevent O-ring over compression and extend its life. While surfaces 102 and 94 are in contact, the pressure equalization surface 104 is still able to be acted upon by the fluid source pressure to maintain a pressure balance across the plug 28. Further, surfaces 102 and 94 provide a metal-to-metal seal, or a type ANSI III seal that acts as a redundant or backup seal in the case of loss of O-ring seal 48.

Figure 16:
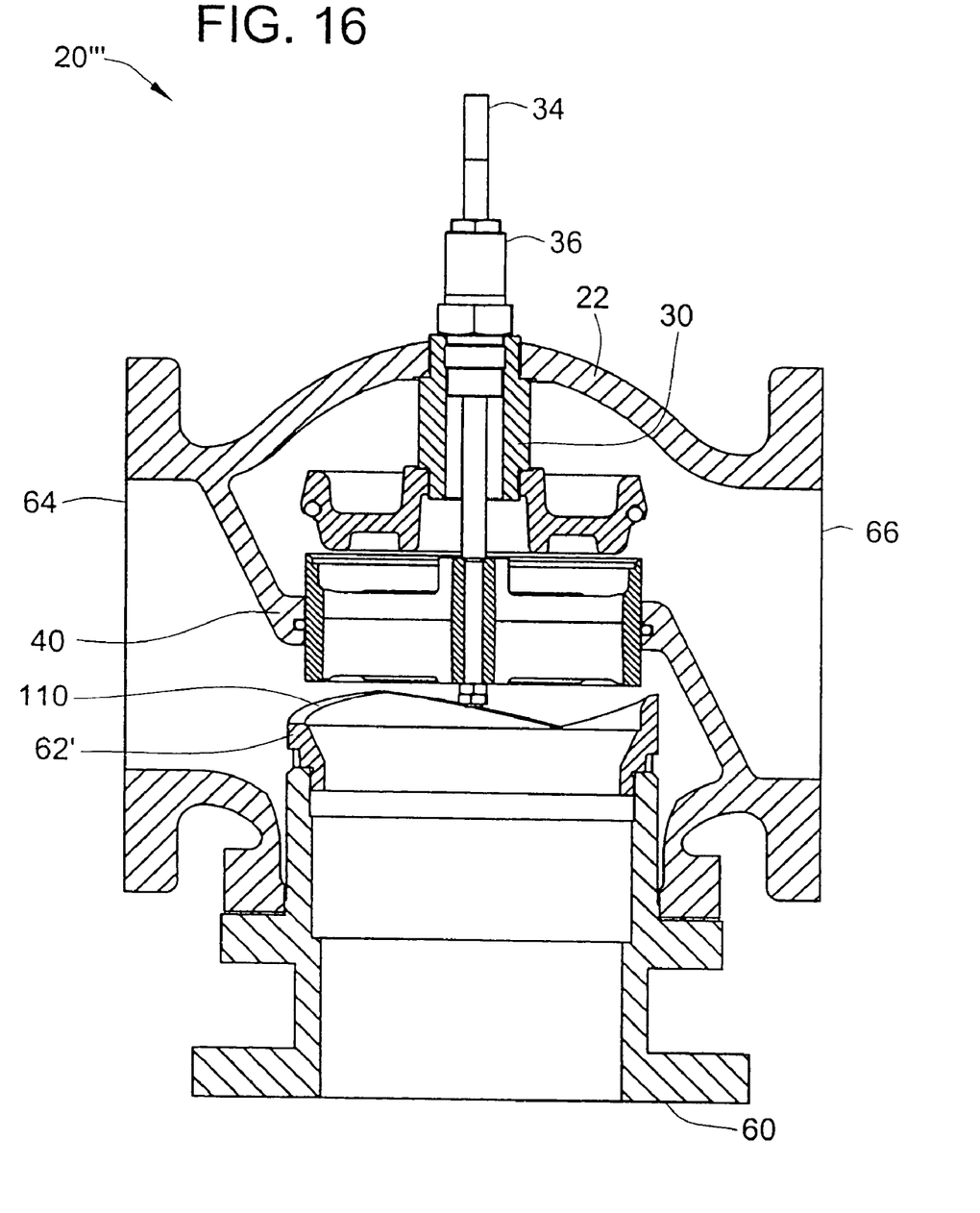
FIG. 16 is a partial sectional view of a v-shaped contour seat for use in an embodiment of the present invention.

A further alternate embodiment of a fully balanced valve constructed in accordance with the teachings of the present invention is illustrated in FIG. 16. As may be seen from this figure, the valve seat 62' has a contoured surface 110 that is used, relative to the position of the plug 28, to regulate the flow of fluid therethrough. In this specific embodiment, the contour is constructed in the form of v-shaped opening. The angle of the contour may be set as desired to achieve a desired flow rate profile as the plug 28 is moved into and out of contact with seat 62'.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A balanced plug valve, comprising:
a valve body defining a flow passage between an inlet and an outlet thereof;
a valve seat having a flow regulating internal contoured wall portion;
a balanced plug linearly movable relative to the valve seat such that the internal contoured wall portion is accommodated inside the balanced plug for regulating a flow of fluid through the flow passage, the balanced plug having a first end exposed to fluid pressure from the inlet and a sealing end having a pressure balancing surface configured to be exposed to the fluid pressure from the inlet when in sealing engagement with the valve seat; and
wherein the sealing end of the balanced plug comprises a shoulder land surface.

2. The balanced plug valve of claim 1, wherein the shoulder land surface is defined between a sealing contact point at an outer most edge of a perimeter wall thereof and a pressure balancing surface defined between the sealing contact point and an inner most edge of the perimeter wall.

3. The balanced plug valve of claim 1, wherein the shoulder land surface is defined between an inner most edge of the perimeter wall and the pressure balancing surface.

4. A balanced plug valve, comprising:
a valve body defining a flow passage between an inlet and an outlet thereof;
a valve seat having a flow regulating internal contoured wall portion;
a balanced plug linearly movable relative to the valve seat such that the internal contoured wall portion is accommodated inside the balanced plug for regulating a flow of fluid through the flow passage, the balanced plug having a first end exposed to fluid pressure from the inlet and a sealing end having a pressure balancing surface configured to be exposed to the fluid pressure from the inlet when in sealing engagement with the valve seat;
wherein the valve seat comprises groove formed therein, further comprising a seal positioned within the groove; and
wherein the groove terminates in a wrap wall portion, and wherein the wrap wall portion is rolled to retain the seal within the groove.

* * * * *

UNITED STATES PATENT AND TRADEMARK OFFICE
CERTIFICATE OF CORRECTION

| | | |
|---|---|---|
| PATENT NO. | : 7,159,617 B2 | Page 1 of 1 |
| APPLICATION NO. | : 11/250956 | |
| DATED | : January 9, 2007 | |
| INVENTOR(S) | : Irving C. Erickson, Hongming Ge and Bonnie Dickinson | |

It is certified that error appears in the above-identified patent and that said Letters Patent is hereby corrected as shown below:

Column 9, line 26, after claim 3, insert the following claim:

--4. The balanced plug valve of claim 1, wherein the valve seat comprises a secondary sealing surface, the shoulder land surface of the balanced plug sealingly engaging the secondary sealing surface upon loss of sealing engagement between a sealing contact point at an outer most edge of a perimeter wall thereof and the valve seat.--

Column 10, line 1, that portion of the text reading "4" should read --5--.

Signed and Sealed this

Tenth Day of April, 2007

JON W. DUDAS
*Director of the United States Patent and Trademark Office*